(12) United States Patent
Weimer

(10) Patent No.: US 8,333,514 B2
(45) Date of Patent: Dec. 18, 2012

(54) ARRANGEMENT FOR HOLDING A BEARING SYSTEM

(75) Inventor: Peter Weimer, Markdorf (DE)

(73) Assignee: Astrium GmbH, Taufkirchen (DE)

( * ) Notice: Subject to any disclaimer, the term of this patent is extended or adjusted under 35 U.S.C. 154(b) by 681 days.

(21) Appl. No.: 12/498,879

(22) Filed: Jul. 7, 2009

(65) Prior Publication Data

US 2010/0008611 A1 Jan. 14, 2010

(30) Foreign Application Priority Data

Jul. 8, 2008 (DE) .......................... 10 2008 031 910

(51) Int. Cl.
*F16C 35/00* (2006.01)

(52) U.S. Cl. ........................................ 384/434; 384/437

(58) Field of Classification Search .................. 384/428, 384/434, 435, 436, 437
See application file for complete search history.

(56) References Cited

U.S. PATENT DOCUMENTS

| 1,739,803 | A | * | 12/1929 | Schlegel et al. ............... 384/398 |
| 4,815,585 | A | * | 3/1989 | May ................................ 198/672 |
| 4,997,123 | A | | 3/1991 | Backus et al. |
| 5,682,069 | A | | 10/1997 | Phillips et al. |
| 5,906,523 | A | * | 5/1999 | Thomson ......................... 440/83 |
| 6,413,144 | B1 | | 7/2002 | Williams |
| 7,857,517 | B1 | * | 12/2010 | Vicars ........................... 384/430 |

FOREIGN PATENT DOCUMENTS

| CH | 696 981 A5 | 2/2008 |
| DE | 1 286 831 | 1/1969 |
| DE | 24 40 717 C2 | 3/1976 |
| DE | 27 03 772 | 8/1978 |
| DE | 39 31 275 A1 | 3/1991 |
| DE | 198 12 223 A1 | 9/1999 |
| DE | 103 25 441 A1 | 1/2005 |
| DE | 103 46 053 B3 | 4/2005 |
| DE | 10 2007 004 335 A1 | 9/2007 |
| FR | 1.338.285 | 9/1963 |
| GB | 1 464 827 A | 2/1977 |
| WO | WO 03/011678 A1 | 2/2003 |

OTHER PUBLICATIONS

German Office Action dated Sep. 21, 2009 (Four (4) pages).
European Search Report with partial translation dated Sep. 25, 2009 (Eight (8) pages).

* cited by examiner

*Primary Examiner* — Phillip A Johnson
(74) *Attorney, Agent, or Firm* — Crowell & Moring LLP

(57) ABSTRACT

An arrangement for force-free retention of a bearing system having an axis of rotation comprises a cylindrical hollow axle for concentrically receiving and holding the bearing system. By way of a hold-down and release mechanism, a bearing shell can be fastened to the hollow axle in such a manner that, when the bearing system is not acted upon by a load, all lateral and axial forces applied to the arrangement can be transmitted via the cylindrical hollow axle into axle receiving devices.

15 Claims, 3 Drawing Sheets

ARRANGEMENT FOR HOLDING A BEARING SYSTEM

BACKGROUND AND SUMMARY OF THE INVENTION

This application claims the priority of German patent application 10 2008 031 910.4, filed Jul. 8, 2008, the disclosure of which is expressly incorporated by reference herein.

The invention relates to an arrangement for the (especially temporary) force-free holding of a bearing system having an axis of rotation.

Highly sensitive optical or electrical scanning systems, such as telescopes, require play-free bearing systems which should influence a driving mechanism of the scanning system as little as possible. This means that the bearing system must generate torque reactions that are as low as possible. An (absolutely) backlash-free bearing system, particularly over large temperature differences, is achieved, for example, by highly preloaded bearing systems which require high driving torques.

So-called Flexpivot bearings have been successful for swiveling movements in an angular range of approximately +/−25°. Such bearings, which maintain their axis of rotation very precisely by way of an elastic deformation of integrated flat spring elements, have the advantage that no friction occurs between rotating parts of the bearing system. However, when the kinematic design is optimal, at zero gravity, Flexpivot bearings are very sensitive to lateral and axial forces, such as generally occur during a rocket launch by which the scanning system is entered into an orbit.

So-called "Hold-Down and Release" mechanisms (HDRM) are used in order to relieve the bearings of the scanning systems. These mechanisms are closed during the rocket launch, and opened in orbit, so that the scanning system can operate in accordance with its determination. A frequent problem occurring with HDRMs is that there is a small overdetermination, so that a deformation of the Flexpivot bearing cannot be completely prevented, and the operability of the Flexpivot bearing may be impaired.

One object of the present invention, therefore is to provide a simple arrangement for (especially temporary) force-free holding of a bearing system having an axis of rotation, without an overdetermination of the holding.

Another object of the invention is to provide such an arrangement which easily permits unlocking for release of the bearing system.

These and other objects and advantages are achieved by the holding arrangement according to the invention, which comprises a cylindrical hollow axle for concentrically receiving and holding a bearing system having an axis of rotation. The center axis or axis of symmetry of the cylindrical hollow axle coincides with the axis of rotation of the bearing system when the latter is received and held by the cylindrical hollow axle. The arrangement also comprises a bearing shell which can be fastened to the hollow axle by a hold-down and release mechanism, in such a manner that all lateral and axial forces applied to the arrangement can be transmitted via the cylindrical hollow axle into axle receiving devices, while the bearing system is not acted upon by a load.

The disposition of the bearing system in the cylindrical hollow axle, which is connected with a bearing shell controlled by the hold-down and release mechanism, achieves an arrangement which has no overdetermination with respect to the bearing system, and can be implemented at a minimal component weight, with compact dimensions. In particular, the arrangement according to the invention permits the use of a bearing system with dimensions that are as small as possible, because the latter needs be designed only for orbital loads, and therefore can build up only low torques. In contrast, stability during the mounting of the bearing system (and particularly during a rocket launch) is provided by the arrangement, and especially by the cylindrical hollow axle. Another advantage of the invention is that it can be applied or used several times.

In one embodiment of the invention, the bearing axle surrounds the hollow axle in the circumferential direction, so that a uniform absorption of the lateral and axial forces is ensured by way of the cylindrical hollow axle.

The hollow axle is advantageously formed of two mutually symmetrically arranged, partial axles which are connected with one another by the bearing system. The lateral and axial forces applied to the arrangement are transmitted by the two partial axles into axle receiving devices, so that the bearing system is uncoupled from such forces as long as the hold-down and release mechanism is locked.

In another embodiment of the invention, the partial axles each have a flange with a bore at their mutually facing ends, for fastening and holding the bearing system, which is connected with the flanges of the partial axles. Advantageously, the bearing system is connected with the hollow axle or with the two partial axles in a material-locking manner. Such material locking can be carried out subsequently by means of an electro plasma welding system, along the entire circumference of the bearing system.

According to a further expedient embodiment of the invention, the partial axles each have a groove at their mutually facing ends on their exterior side, into which groove the bearing shell engages in a form-locking manner. In this case, the groove extends particularly along an outer circumference of the partial axle. The respective grooves advantageously have a continuous (i.e., surrounding) construction.

The bearing shell may comprise first and second bearing shell parts, which are rotatably connected with one another at their first end and which, at their second (opposite) ends, are connected with one another under high prestress by means of the hold-down and release mechanism. As a result of the two-part embodiment of the bearing shell, on the one hand a simple and firm connection with the hollow axle can take place. On the other hand, by opening the two bearing shell parts, an application of force on the hollow axle can be prevented, so that the bearing system can be used for its purpose. The connection of the two bearing shell parts at their first end and their fixing while applying a high prestress by means of the hold-down and release system permits a simply designed construction, and the reliable provision of a not overdetermined holding mechanism for the bearing system. The high prestress at the two ends permits an automatic "opening" of the bearing shell as soon as the hold-down and release mechanism no longer applies a force for pressing together the two ends.

Advantageously, a spring element may also be provided between the two ends of the bearing shell parts. The spring element causes a defined opening of the bearing shell parts when the hold-down and release mechanism for unlocking the arrangement according to the invention is triggered.

According to a further embodiment of the invention, the hold-down and release mechanism may comprise a bolt separating mechanism, for example, in the form of a known Frangibolt mechanism which, when correspondingly controlled, disconnects the mechanical connection of the two ends of the bearing shell parts and thereby terminates its force effect on the hollow axle.

For absorbing forces occurring during a rocket launch, the hollow axle may be formed particularly of a highly rigid material, such as titanium. As explained above, it thereby becomes possible to dimension the bearing system only for orbital loads, so that it builds up only low torques, as required for highly precise scanning elements. Correspondingly, the bearing shell is made of the same high-strength material (titanium).

It is further provided that the hollow axle may be manufactured in one setting.

In the arrangement according to the invention, the bearing system advantageously comprises a tension-free Flexpivot bearing, which very precisely maintains its axis of rotation by way of an elastic deformation of integrated flat spring elements, without causing any friction between the rotating parts. Flexpivot bearings of this type are known from the state of the art.

Other objects, advantages and novel features of the present invention will become apparent from the following detailed description of the invention when considered in conjunction with the accompanying drawings.

DETAILED DESCRIPTION OF THE DRAWINGS

Figure 1:
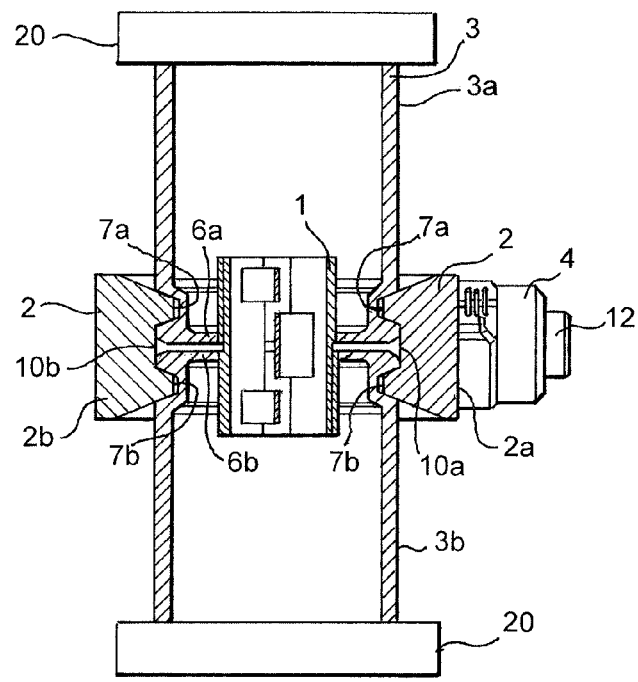
FIG. 1 is a cross-sectional view of an arrangement according to the invention, for force-free holding of a bearing system.

To protect a Flexpivot bearing system 1 against lateral and axial forces, such as occur for example during a rocket launch, the arrangement according to the invention comprises a hollow axle 3, which is formed of two partial axles 3a, 3b, and forms a bearing axle. As illustrated in FIG. 1, the partial axles 3a, 3b are arranged symmetrically to one another and are manufactured in one setting. The hollow axle 3 and its partial axles 3a, 3b respectively are preferably made of a highly rigid material (such as titanium).

At their mutually facing ends, the partial axles 3a, 3b have a flange 6a, 6b with a bore for receiving and holding the Flexpivot bearing 1, which is inserted into the bores of the flanges 6a, 6b and is welded on both sides and all round (for example, by means of an electro plasma welding system). In this case, the Flexpivot bearing 1 comes to be situated in the hollow axle 3, such that an axis of rotation of the Flexpivot bearing is situated with an axis of symmetry of the hollow axle 3. Furthermore, the arrangement takes place such that, when the arrangement is unlocked, the two mutually prestressed partial sections of the Flexpivot bearing 1 can be rotated.

Figure 2:
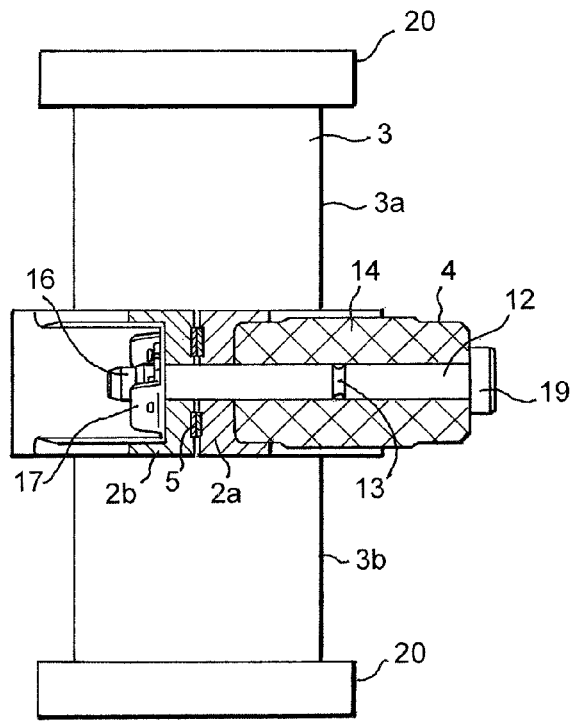
FIG. 2 is a sectional view of the hold-down and release mechanism in FIG. 1.
Figure 3:
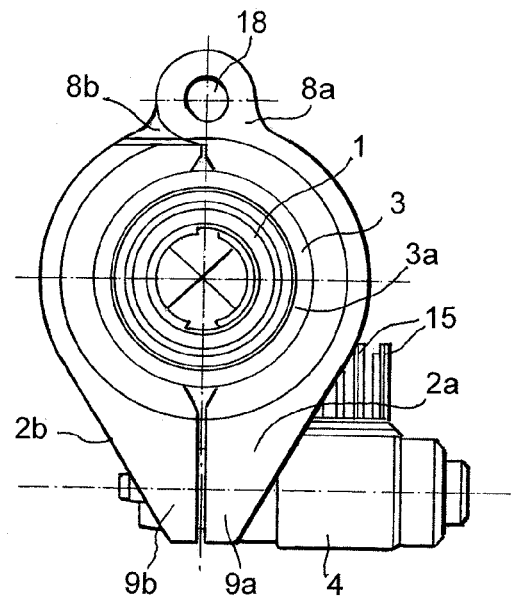
FIG. 3 is a top view of the arrangement according to the invention.
Figure 4:
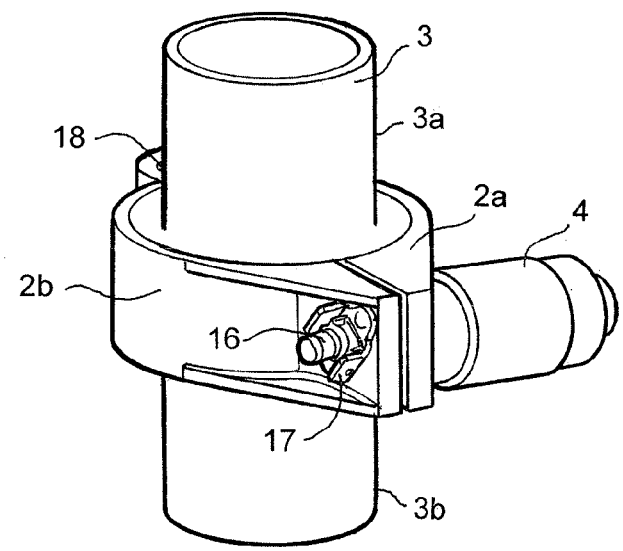
FIG. 4 is a perspective view of the arrangement according to the invention, showing a force-free mounting of the bearing system.

A bearing shell 2 surrounding the hollow axle 3 is provided for the fixing the partial axles 3a, 3b of the hollow axle 3 and for targeted guidance of all applied lateral and axial forces directly by way of the hollow axle 3 into a structure-side axle receiving device 20 (shown schematically in FIGS. 1 and 2). The bearing shell 2 comprises two bearing shell parts 2a, 2b which, at a first end 8a, 8b (compare FIG. 3), are rotatably connected with one another by way of a hinge 18. A highly rigid material (for example, titanium) is preferably used as material for the bearing shell parts 2a, 2b. A hold-down and release mechanism, which is provided at a second end 9a, 9b of the bearing shell parts 2a, 2b situated opposite the first end 8a, 8b, is constructed as a bolt separating mechanism. In the illustrated embodiment, the latter is a so-called Frangibolt mechanism.

As best seen in the cross-sectional view of FIG. 1, the essentially identically constructed bearing shell parts 2a, 2b have a centrally extending groove 10a, 10b. Each of the hollow axles 3a, 3b has one groove 7a and 7b respectively in the area of the Flexpivot bearing 1, which grooves 7a, 7b extend along the circumference of the respective partial axles 3a, 3b. The bearing shell 2 is arranged on the hollow axle 3 in such a manner that the webs forming the groove 10a, 10b project form-lockingly in the grooves 7a and 7b respectively of the partial axles 3a, 3b. In this case, the mutually adjacent webs of the grooves 7a and 7b respectively project to or adjoin the bottom of the grooves 10a, 10b of the bearing shell parts 2a, 2b.

The two ends 9a, 9b of the bearing shell parts 2a, 2b are connected with one another under high prestress by way of the Frangibolt mechanism 4. A spring element 5 arranged between the two ends 9a, 9b, assists in opening the bearing shell parts 2a, 2b (compare FIG. 2 as well as FIG. 5) when the Frangibolt mechanism 4 is triggered.

As long as the Frangibolt mechanism is closed, all applied lateral and axial forces are transmitted directly via the massive exterior partial axles 3a, 3b of the hollow axle 3 into the structure-side axle receiving devices 20, without subjecting the Flexpivot bearing (which is surrounded by the hollow axle 3) to a load. After the opening of the Frangibolt mechanism 4, the bearing shell parts 2a, 2b are opened by way of the spring element 5 by a defined path (for example, from 0.5 to 1.5 mm). This opening distance of the two ends 9a, 9b of the bearing shell parts 2a, 2b leads directly to completely exposed partial axles 3a, 3b, so that all forces acting upon the arrangement are automatically guided by way of the Flexpivot bearing arranged in the interior of the hollow axle 3. The Flexpivot bearing will now permit a rotating movement. However, a radial or axial displacement under orbital loads continues to be prevented by the Flexpivot bearing.

Figure 5:
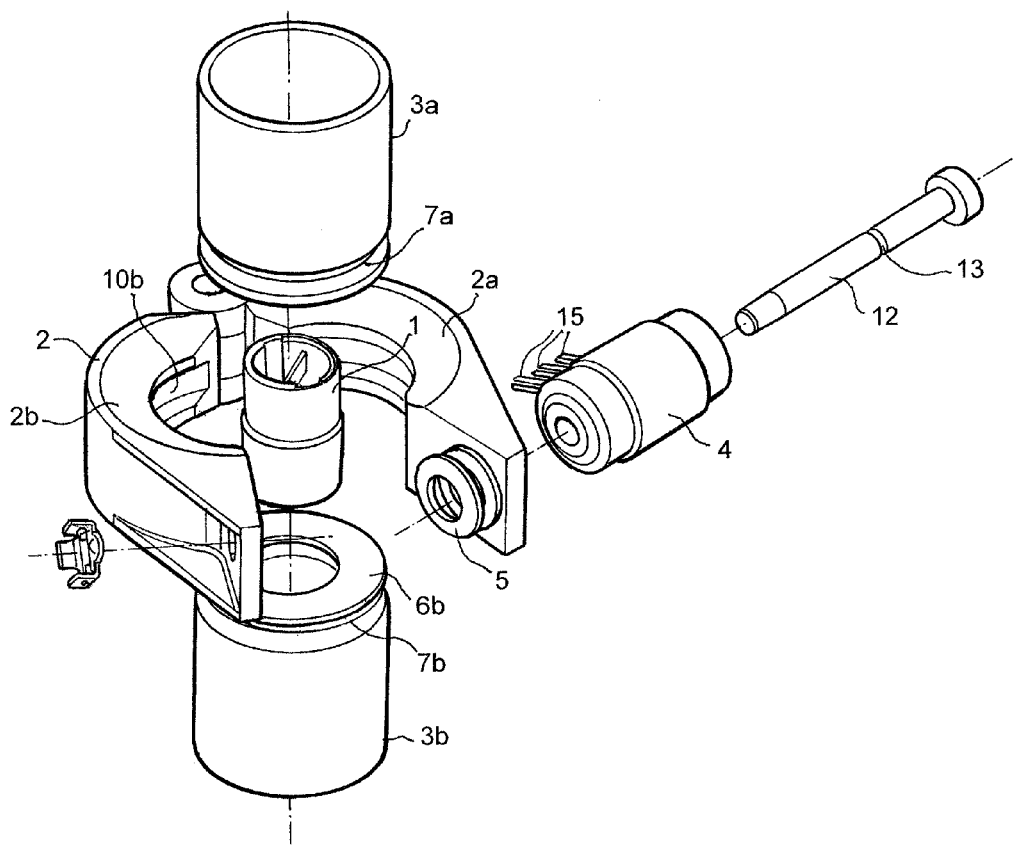
FIG. 5 is a perspective exploded view of the arrangement according to the invention.

The embodiment of the Frangibolt mechanism 4, which is known per se, and is best seen in FIGS. 2 and 5, represents a bolt separating mechanism. For this purpose, the latter has a bolt 12 with a groove 13 in the interior of a jacket 14. At a first end, the bolt 12 has a bolt head 19 which supports itself on the jacket 14. At its opposite end, the bolt 12 is screwed to a nut 16. An intermediate element 17 for absorbing force is arranged between the nut 16 and the second end 9b of the bearing shell part 2b. As a result of the screwed connection, high prestress can be exercised on the bearing shell parts 2a, 2b.

An actuator (not shown) which is provided in the interior of the jacket 14 and adjoins the surface of the bolt 12, causes the bolt to be broken at a predefined location (as a rule, in the area of the groove 13). As a result of the high prestress, and with the assistance of the spring element 5, the above-described opening of the bearing shell 2 now takes place, releasing the Flexpivot bearing. The actuator may comprise, for example, a heating element that is heatable via connection lines 15. The connection lines 15 for controlling the actuator are illustrated, for example, in FIGS. 3 and 5.

The invention has the following advantages:

The arrangement according to the invention, comprising the hollow axle, the bearing shell and the hold-down and release mechanism, has no overdetermination with respect to the Flexpivot bearing arranged in the interior of the hollow axle.

As a result of the dimensioning of and the material selection for the hollow axle, the Flexpivot bearing can be dimensioned to be as small as possible because the latter needs be dimensioned only with respect to orbital loads and therefore has only slight torque reactions. It is advantageous to use a highly rigid material, such as titanium, for the hollow axle. The arrangement according to the invention will then have a small size while the weight of the components is as low as possible.

Qualified bolt separating mechanisms, such as the Frangibolt mechanism, can be used as the hold-down and release mechanism. In this case, the activating bolt does not have to be completely drawn and captured, as usually required, because a short activating path (opening distance) in the range of from 0.5 to 1.0 mm is sufficient.

When the arrangement is activated, the shock-caused stress upon a spacecraft can be minimized.

The arrangement according to the invention can be applied or used several times. Furthermore, the arrangement can also be constructed as a so-called "low-shock mechanism"; for example, by bracing the bearing shell parts by means of a very geared-down motor.

The invention was described by means of a Flexpivot bearing but can also be used for other highly sensitive bearing systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Flexpivot bearing
2 bearing shell
2a, 2b bearing shell part
3 hollow axle (bearing axle)
3a, 3b partial axle
4 hold-down and release mechanism
5 spring element
6a, 6b flange
7a, 7b groove
8a, 8b first end of the bearing shell parts 2a, 2b
9a, 9b second end of the bearing shell parts 2a, 2b
10a, 10b groove of the bearing shell parts 2a, 2b
11a, 11b web
12 bolt
13 groove in the bolt
14 jacket of the hold-down and release mechanism
15 connection line
16 nut
17 intermediate element
18 hinge of the bearing shell
19 bolt head
20 axle receiving device

What is claimed is:

1. An apparatus for force-free holding of a bearing system having an axis of rotation, said apparatus comprising:
a cylindrical hollow axle for concentrically receiving and holding of the bearing system;
a bearing shell; and
a hold-down and release mechanism for fastening the bearing shell to the hollow axle such that, when the bearing system is not acted upon by a load, all lateral and axial forces applied to the apparatus are transmitted via the cylindrical hollow axle into axle receiving devices.

2. The apparatus according to claim 1, wherein the bearing shell surrounds the hollow axle in the circumferential direction.

3. The apparatus according to claim 1, wherein the hollow axle comprises two mutually symmetrically arranged partial axles which are connected with one another by way of the bearing system.

4. The apparatus according to claim 3, wherein at their mutually facing ends, the partial axles each have a flange with a bore for receiving and holding the bearing system.

5. The apparatus according to claim 4, wherein the bearing system is connected with the flanges of the partial axles.

6. The apparatus according to claim 3, wherein at their mutually facing ends, the partial axles each have a groove on their exterior side, the bearing shell form-lockingly engaging in the groove.

7. The apparatus according to claim 6, wherein the respective grooves have continuous constructions.

8. The apparatus according to claim 6, wherein the bearing shell comprises first and second bearing shell parts, which, at a first end, are rotatably connected with one another and which, at a second end, opposite said first end, are connected with one another by means of the hold-down and release mechanism.

9. The apparatus according to claim 8, wherein:
a spring element is provided between the two ends of the bearing shell parts; and
the spring element causes a defined opening of the bearing shell parts when the hold-down and release mechanism is triggered.

10. The apparatus according to claim 1, wherein the bearing system is connected with the hollow axle in a material-locking manner.

11. The apparatus according to claim 1, wherein the hold-down and release mechanism comprises a bolt separating mechanism.

12. The apparatus according to claim 1, wherein the hollow axle is constructed of a highly rigid material.

13. The apparatus according to claim 1, wherein the bearing shell is constructed of a high-strength material.

14. The apparatus according to claim 1, wherein the hollow axle is manufactured in a single setting.

15. The apparatus according to claim 1, wherein the bearing system is a tension-free Flexpivot bearing.

* * * * *